April 18, 1939.    W. C. TYLER    2,155,157
BUMPER TYPE AUTO JACK
Filed Feb. 3, 1936    2 Sheets-Sheet 1
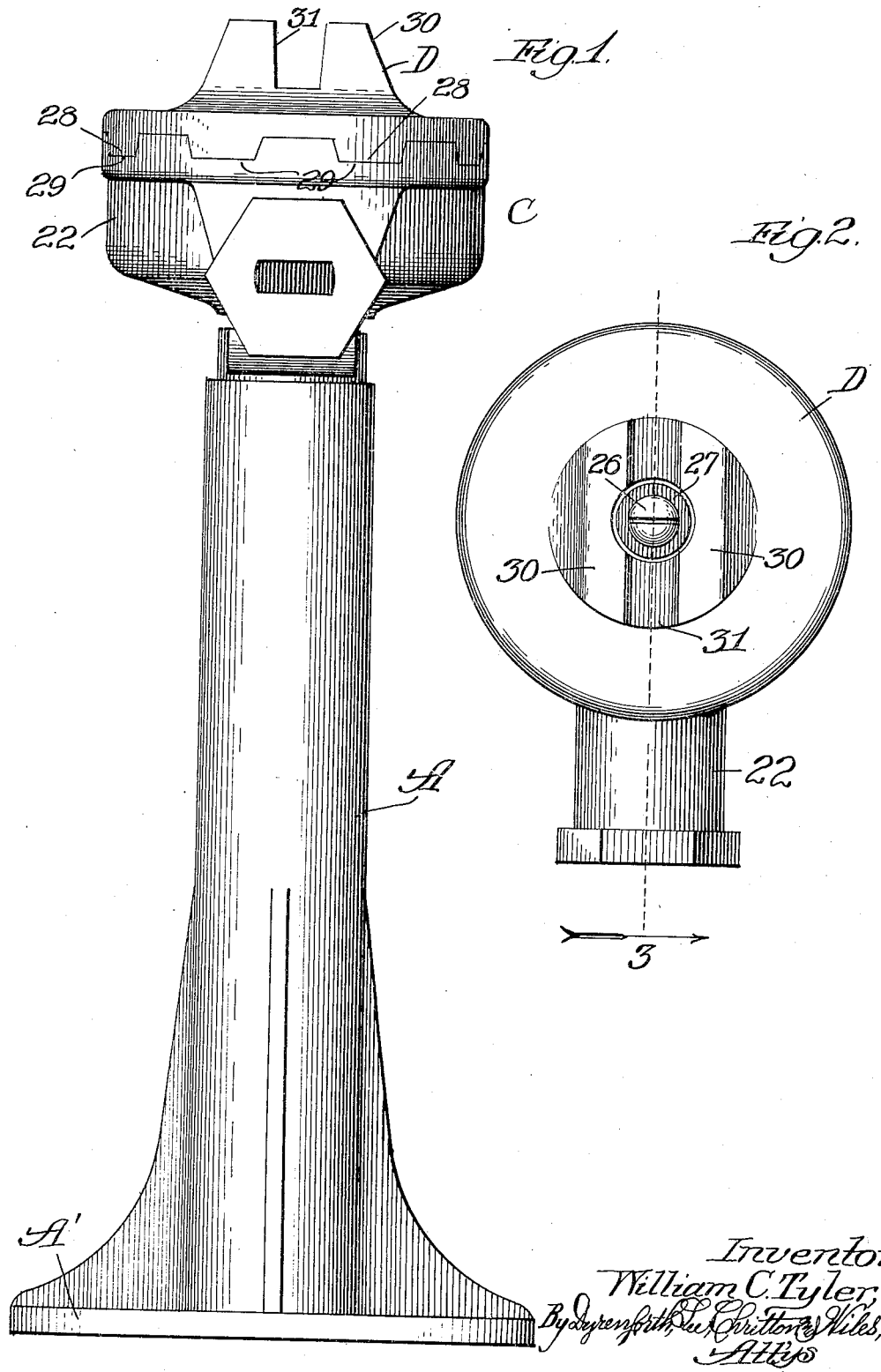
Inventor:
William C. Tyler,
By Dyrenforth, Lee, Chritton & Wiles,
Attys

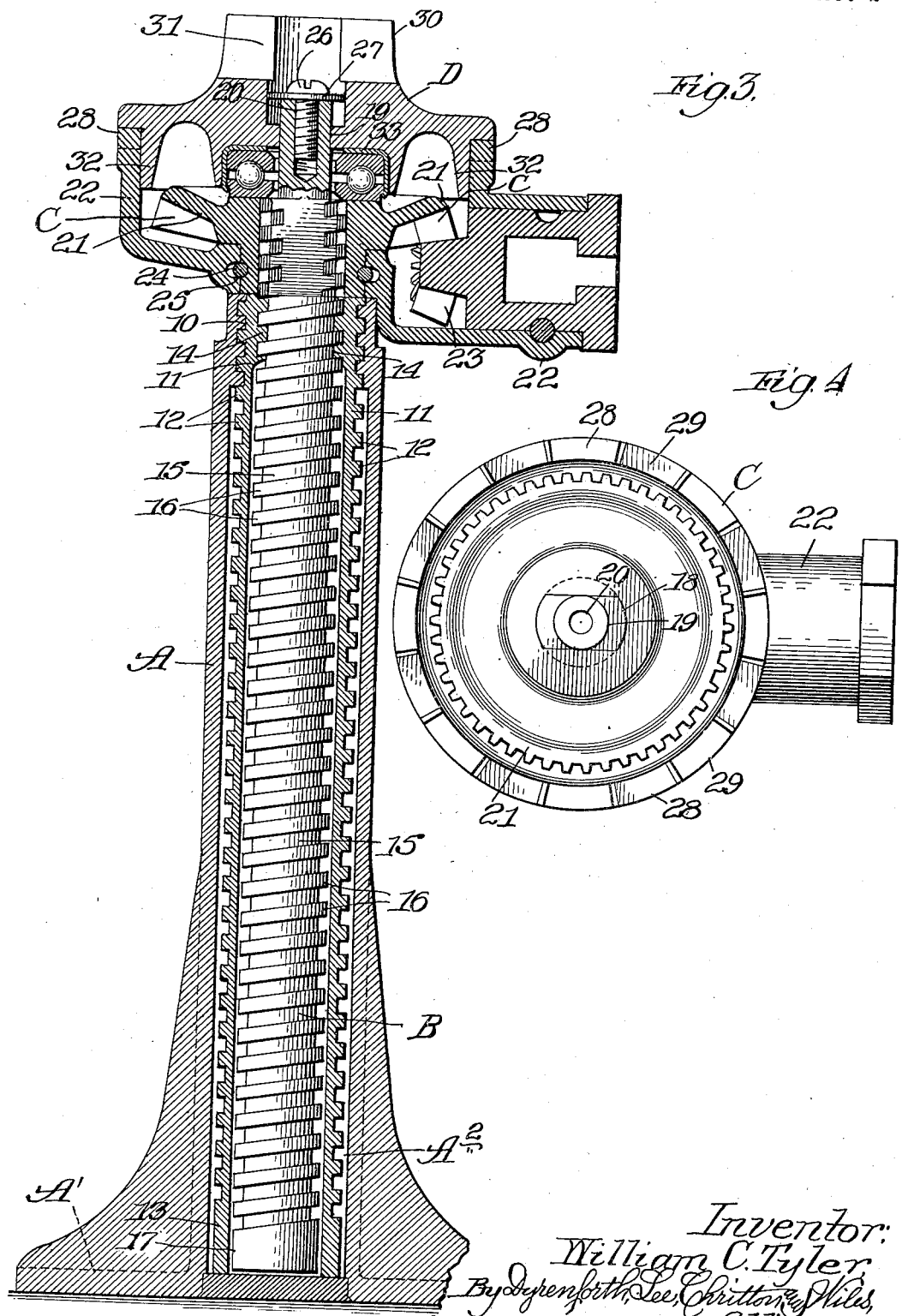

Patented Apr. 18, 1939

2,155,157

UNITED STATES PATENT OFFICE 2,155,157

BUMPER TYPE AUTO JACK

William C. Tyler, Joliet, Ill., assignor to William E. Pratt Mfg. Co., Joliet, Ill., a corporation of Illinois Application February 3, 1936, Serial No. 62,196

5 Claims. (Cl. 254—100)

This invention relates to screw jacks. The particular embodiment shown is of a type well adapted to lifting an automobile at a bumper, but the invention may be adapted to other types and different uses.

An object of the invention is to provide a jack which is simple and convenient, and which requires only a minimum amount of time and effort to operate. Another object is to provide a screw jack in which most of the working parts are enclosed in such a manner as to exclude dirt, grit, etc. A further object is to provide a new jack construction which is adjustable to particular needs and which is adapted to securely hold the object to be raised. Other objects and advantages will appear as the specification proceeds.

The invention is illustrated in a preferred embodiment in the accompanying drawings in which—

Figure 1 is a front view in elevation; Figure 2, a top plan view of the upper portion; Figure 3, a vertical sectional view taken at line 3 of Figure 2; and Figure 4, a top view similar to Figure 2, but with the head and bearing removed.

In the illustration given, A designates a jack casing which is provided with a base A' and a bore A², B designates the screw means, C designates the driving mechanism, and D designates the head.

The jack casing A may be of any well known construction and material. The height of the casing and the size of the base A' are factors which may be varied according to the particular conditions under which the jack is to be operated. At the top part of the casing are internal threads 10 adapted to receive screw means B.

In the illustration given, the screw means B is shown as of the double-lift type and comprises an inner screw 15 and outer screw 11. The outer screw 11 is hollow and sleeve-like in character. Its external surface has threads 12 throughout its length except for a short unthreaded portion 13 at its lower end. Its internal surface is cylindrical in form with internal threads 14 at its upper portion. The inner screw 15 is provided with external threads 16 which extend throughout its length except for the extreme top portion and the short unthreaded portion 17 at its lower end. External threads 12 on the outer screw are adapted to engage internal threads 10 of the casing, and external threads 16 of the inner screw are adapted to engage internal threads 14 of the outer screw. The edges of the threaded portions of the screws are provided with shoulders or stops to eliminate binding when the screw has reached its limit. If desired, the extreme ends of the threads may be turned inward to form stops, in which construction the unthreaded portions may be omitted.

The top portion of screw 15 has an extension 18 which has flattened sides. Above extension 18 is a cylindrical extension 19 which is provided with a tapped screw hole 20 in the end.

The drive mechanism C consists of a drive gear 21 rotatably fastened inside a housing 22 in which housing is also a beveled gear member 23. A lower cylindrical extension of drive gear 21 is arranged to fit down into the bottom of housing 22 and be fastened there free to rotate by means of a split ring 24 and aligned annular grooves 25.

All of mechanism C is adapted to be mounted on the top portion of screw 15. As shown in Figure 4, drive gear 21 has a central opening allowing it to be fitted down over the flattened extension 18 of the inner screw. When mounted in this way, rotation of drive gear 21 will cause rotation of screw 15, but will not cause rotation of housing 22.

A beveled gear member 23 is rotatably secured in housing 22, and is adapted to be actuated by a crank or shaft (not shown), and to engage with and cause rotation of drive gear 21.

The head D has a countersunk central opening allowing it to fit down over the cylindrical extension 19, and a screw 26 with a washer 27 is employed to prevent accidental detachment. The circular edge of head D is provided with teeth 28 which are arranged to fit down into corresponding depressions 29 in the upper circular edge of housing 22. The top of head D is provided with a raised portion 30 which has a slot or groove 31. Groove 31 is intended to securely engage the bumper of an automobile or other object to be raised.

Adjustment of the angular position of the groove 31 is effected by raising the head sufficiently to disengage teeth 28 and rotating the head to the desired position where teeth 28 may again engage depressions in housing 22. An annular skirt 32 helps to guide this movement and to prevent dislocation of the head.

The weight of the object lifted and the weight of head D is supported on the screw 15 preferably by means of a bearing 33 between drive gear 21 and head D. The bearing employed in the present illustration consists of two annular rings between which steel balls are allowed to roll in annular grooves. The under side of the head and the top of the drive gear 21 are fashioned to accommodate this bearing.

In the operation of the jack, the rotation of the beveled gear member 23 causes rotation of drive gear 21 and screw 15. Rotation of screw 15 is accompanied by elevation of this screw and also of the head D and drive mechanism C. Such operation may continue until the unthreaded portion 17 impinges the shoulder of threads 14, at which time screw 11 is caused to rotate along with screw 15, and the elevation of the head and drive mechanism continues until the unthreaded portion 13 impinges the shoulder of threads 10.

The lowering of the jack may be effected by rotation of the crank or other actuating means in an opposite direction. After the load is removed, the crank may be taken off and the jack easily reduced to collapsed condition by simply setting the head and housing in rotation, the momentum of these parts helping the screw to rotate until the jack is collapsed.

In operating this jack, the operator need not stoop all the while, for as the jack is operated the driving gears are raised, and the operator may conveniently assume a slightly different position. This feature is found to make the jack less tiresome on the person who operates it.

Another important operating feature is that after the base has been set, the angle at which the drive mechanism is operated may be changed to suit the convenience of the operator, the position of the base remaining fixed. This feature is especially appreciated when the jack is operated in close or awkward quarters.

Also the head may be adjusted so that it is in a position to hold firmly to the bumper or other object to be lifted at any convenient angle of the drive mechanism. Such construction eliminates the common trouble of having the head slip and the load fall off while the jack is in operation; thus the jack is one highly desirable from the standpoint of safety.

The foregoing detailed description has been given for clearness of understanding only and no unnecessary limitations should be understood therefrom, but the appended claims should be construed as broadly as permissible in view of the prior art.

I claim:

1. A jack comprising a hollow casing, screw means engaging with the interior of said casing, a housing, drive gears in said housing for actuating said screw means, said housing being mounted on one side of said drive gears, and a head rotatably supported on said screw means, said head being in releasable engagement with said housing to prevent rotation with respect thereto when a weight is supported on said head, said head and housing being inseparable vertically through operation of said screw means.

2. A jack comprising: a hollow casing; a hollow screw engaging the interior of said casing; an inner screw engaging the interior of said hollow screw; drive mechanism mounted on said inner screw, said drive mechanism including driving gears and a housing which is rotatably supported by said inner screw and which is provided at its upper edge with spaced notches; and a head rotatably supported by said inner screw, said head being provided at its edge with teeth adapted to engage the spaced notches in said housing.

3. A jack comprising a hollow casing having a base at the bottom thereof, said base being fixed with respect to said casing, a hollow screw engaging the interior of said casing, an inner screw engaging the interior of said hollow screw, a drive gear secured to said inner screw, means for actuating said drive gear, a housing enclosing said means rotatably supported by said inner screw, and a head rotatably supported on said drive gear, said head being provided with means for releasably engaging said housing and preventing rotation with respect thereto.

4. A jack comprising: a hollow casing; a hollow screw engaging the interior of said casing; an inner screw engaging the interior of said hollow screw; drive gears carried by said inner screw, a housing member supported by said inner screw and having upwardly extending edges, and a head rotatably supported by said inner screw, the edges of said head and housing being provided with interengaging teeth by which relative rotation of said head and housing is prevented while said head is under load, said head having a skirt portion engaging the interior of said housing adjacent said interengaging teeth.

5. A jack comprising: a hollow casing; screw means engaging the interior of said casing, a housing rotatably mounted on said screw means, drive gears within said housing for rotating said screw means, a head rotatably supported on said screw means and having a central passage therethrough, the edges of said head and housing being provided with engaging means to prevent interrotation when said head is in lowered position, said screw means being provided with an upper extension received within said central passage, and means attached to said upper extension for preventing detachment of said head from said screw means but permitting said head to be raised sufficiently to allow release of said engaging means.

WILLIAM C. TYLER.